(12) United States Patent
Golder

(10) Patent No.: X9118
(45) Date of Patent: Sep. 26, 1835

(54) BILLS OF CREDIT

(76) Inventor: John Golder

John Golder
Letters Patent

The Schedule referred to in these Letters Patent and making part of the same containing a description in the words of the said John Golder himself of his improvement in the art of Public finance in loaning and actually employing credit

---

To all to whom these presents shall come. Be it known that I John Golder of the City of Philadelphia and state of Pennsylvania have discovered invented and formed a new and valuable accumulative or interest bearing check a credit chart based upon a new principle in monitary negotiations and to be used as a useful improvement in the art of finance to be used only in the negotiations of loans upon contract with actual capitalists or in guarantee a transfer of bona fide deposits and investments to be made a full and exact description of which in proof and drawing thereof as invented and written by me and hereafter is designed to be used as aforesaid only excepting the names, sums, dates, and vignets which are at all times to be written and filled up in the own proper hand writing of the person or persons concerned conformable to the contracts made or to be made with the party or parties contracting therefor is hereunto annexed and the inventor and author claims as his invention not only the design and writing of the chart or check above described and attached hereto according to the specific form and definate advantages of creating and sustaining credit upon its peculiar solid principle of accumulative action and the right and priviledge of using it as an improvement in negotiation of loans and investments of capital upon permanent visible security but also the operative principle upon which it is based which will admit of numerous variations in the form or manner of lending or constructing the same whilst the principle upon which it is intended to operate will remain substantially the same and would be therefore necessarily considered as an evasion of my right Witnesses Thos. P. Jones
Robt. Mills John Golder Each check or draft is endorsed by the actuary receivable on demand in payment of instalments or in purchase of stock Golder's accumulative Patent interest bearing check or Chart Mutual Credit Office Check or Chart
Payable on demand with interest from date No Philadelphia Actuary of Golder's mutual credit of loan and deposit office
Pay to the order of a bearer
dollars and cents with interest computed
at per cent: from the entry hereof the same being negotiated
for and payment guaranteed by actual deposit at the company's
Office this day Entered day of 183

Secretary

Jno. Golder L.S.

[illegible]

Entered according to the act of Congress in the year 1835 by John Golder
in the office of the Clerk of the District Court for the Eastern District of Pennsylvania Exd
[illegible]